April 7, 1959     G. T. AMATO     2,881,382
ABSOLUTE D. C. VOLTAGE REFERENCE
Filed May 7, 1958
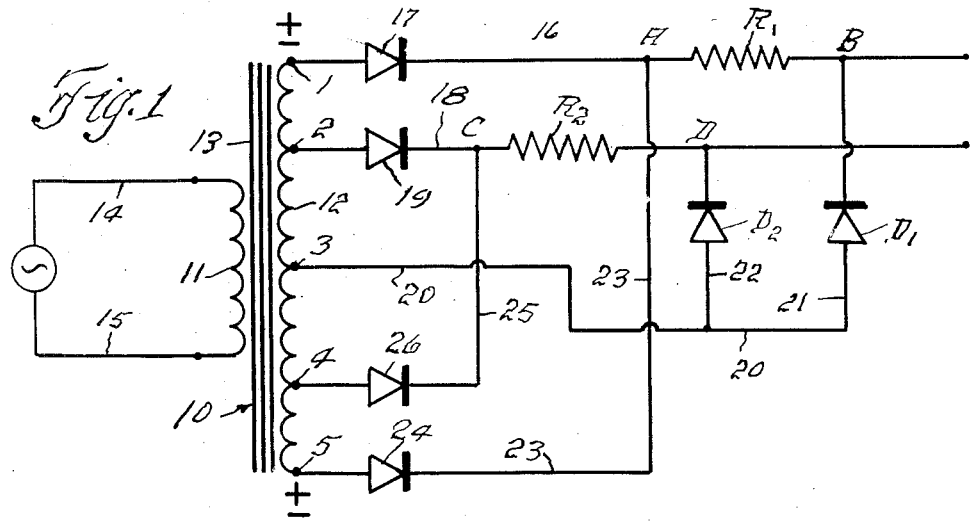
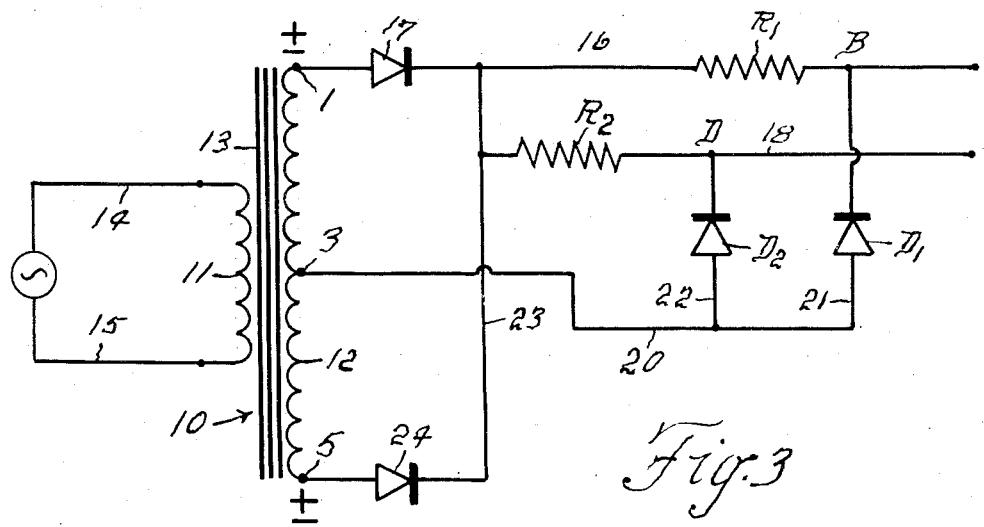
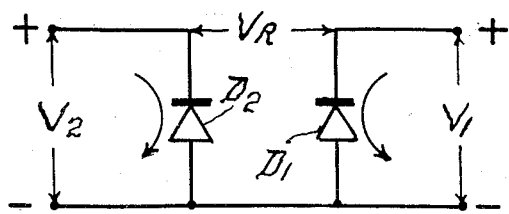
INVENTOR
Geatano T. Amato
BY Victor D. Borst
ATTORNEY United States Patent Office 2,881,382
Patented Apr. 7, 1959

2,881,382

ABSOLUTE D.C. VOLTAGE REFERENCE

Gaetano T. Amato, Bronx, N.Y., assignor to Sperry Rand Corporation, Ford Instrument Company Division, Long Island City, N.Y., a corporation of Delaware Application May 7, 1958, Serial No. 734,085

20 Claims. (Cl. 321—16)

This invention relates to a new and improved means for providing an absolute D.C. reference voltage.

Heretofore calibrated standard voltage cells have been used as an absolute D.C. reference voltage.

The use of calibrated voltage cells as an absolute D.C. reference voltage has certain inherent disadvantages. It is therefore the principal object of this invention to provide a replacement for calibrated voltage cells as an absolute D.C. reference voltage, in which the aforesaid disadvantages are eliminated.

Another object of the invention is to utilize an A.C. input voltage in obtaining a D.C. output voltage for use as an absolute D.C. reference voltage.

Another object of the invention is to obtain a constant D.C. output voltage from a fluctuating A.C. input voltage.

Another object of the invention is to provide absolute D.C. reference voltage means which is of very simple construction, in which all of the basic components are passive elements and relatively inexpensive.

Still another object of the invention is to provide a reference voltage means, of the aforesaid character, having superior inherent shock and vibration characteristics.

In accordance with the invention I utilize the zener characteristics of silicon reference diodes to produce an absolute D.C. voltage, and employ two silicon reference diodes having identical slopes, but different voltage intercepts. The circuit arrangement of the diodes is such that the D.C. reference voltage is the difference between the voltages across each diode.

Having stated the principal objects of the invention other and more limited objects of the invention will be apparent from the following specification and the accompanying drawings forming a part thereof, in which:

Fig. 1 is an electrical diagram illustrating the principal embodiment of the invention by which an absolute D.C. reference voltage is produced;

Fig. 2 is a simplified diagram illustrating the principle upon which the invention is based; and Fig. 3 is a view similar to Fig. 1 illustrating a modification of the invention which may be used when a lower order of dynamic accuracy is satisfactory for a reference voltage.

Referring now to Fig. 1 of the drawings by reference characters, the numeral 10 indicates generally a transformer having the primary winding 11, the secondary winding 12 and the core 13. The primary winding 11 is connected to a source of alternating current by the conductors 14 and 15; and the secondary winding 12 is provided with end taps 1 and 5, a center tap 3, and intermediate taps 2 and 4. A conductor 16 having a resistor $R_1$ and a diode 17 interposed therein is connected to the tap 1; and a conductor 18 having a resistor $R_2$ and a diode 19 interposed therein is connected to the tap 2. A conductor 20 which is connected to the center tap 3 is connected to the conductor 16 beyond the resistor $R_1$ at B by a conductor 21 having a diode $D_1$ interposed therein, and to the conductor 18 beyond the resistor $R_2$ at D by a conductor 22 having a diode $D_2$ interposed therein. The end tap 5 is connected to the conductor 16 at A, between the diode 17 and the resistor $R_1$, by a conductor 23 having a diode 24 interposed therein; and the intermediate tap 4 is connected to the conductor 18 at C, between the diode 19 and the resistor $R_2$ by a conductor 25 having a diode 26 interposed therein.

The diodes 17, 19, 24 and 26 are conventional rectifying diodes which are poled to pass only positive pulses from the secondary winding 12; and the diodes $D_1$ and $D_2$ are silicon reference diodes having zener characteristics. The resistors $R_1$ and $R_2$ are so set that the ratio of the D.C. voltage across the resistors $R_1$ and $R_2$ is equal to the ratio of the D.C. voltage across the diodes $D_1$ and $D_2$.

As is characteristic of transformers of this type when one end of the secondary winding thereof is positive, the opposite end thereof is negative. Therefore when the taps 1 and 2 are positive the taps 5 and 4 will be negative and, vice versa, when the taps 5 and 4 are positive the taps 1 and 2 will be negative. When the taps 1 and 2 are positive and the taps 5 and 4 are negative, D.C. current will flow from the tap 1 through conductor 16, and the diode 17 and resistor $R_1$ interposed therein, and back to the center tap 3 through the conductor 21, and the diode $D_1$ interposed therein, and conductor 20; and at the same time D.C. current will also flow from the tap 2 through the conductor 18 and diode 19 and resistor $R_2$ interposed therein and back to the center tap 3 through the conductor 22, and diode $D_2$ interposed therein, and conductor 20.

When the taps 5 and 4 are positive and the taps 1 and 2 negative, D.C. current will flow from the tap 5 through the conductor 23 and the diode 24 interposed therein to the conductor 16 and thence through the resistor $R_1$ and back to the center tap 3 through the conductor 21, and the diode $D_1$ interposed therein, and the conductor 20. At the same time, D.C. current will flow from the tap 4 through the conductor 25 and the diode 26 interposed therein to the conductor 18 and thence through the resistor $R_2$ and the back to the center tap 3 through the conductor 22, and the diode $D_2$ interposed therein, and the conductor 20. It will therefore be seen that there is a constant flow of D.C. current through the resistor $R_1$ and the diode $D_1$, and at the same time there is a constant flow of current of a lesser voltage through the resistor $R_2$ and the diode $D_2$. The reference voltage is the difference between the voltage at the output terminal B of the current flowing through the resistor $R_1$ and the voltage at the output terminal D of the current flowing through the resistor $R_2$. This reference voltage will always be constant and absolute, due to the fact that the two silicon reference diodes $D_1$ and $D_2$ have different voltage intercepts but identical slopes, and that the resistors $R_1$ and $R_2$ are so set that the ratio of the D.C. voltage across the resistors $R_1$ and $R_2$ is equal to the ratio of the D.C. voltage across the diodes $D_1$ and $D_2$, as will be hereinafter mathematically shown with reference to Figs. 1 and 2.

A plot of the voltage current characteristics of a silicon reference diode in the zener region on semi-log paper shows that the curve approaches a straight line and can be mathematically expressed as $$V = [m \log I + V'] \qquad (1)$$

where V is the voltage across the diode, I is the current through the diode, V' is the voltage intercept and m is the slope of the line.

As shown in Fig. 1 the circuit employs two silicon reference diodes $D_1$ and $D_2$ with identical slopes but different voltage intercepts, and the circuit arrangement of the two diodes is such that the D.C. reference voltage is the difference between the voltages across each diode, as shown schematically in Fig. 2 in which $V_1$ is the voltage across diode $D_1$, $V_2$ is the voltage across diode $D_2$, and $V_R$ is the reference voltage. This is expressed mathematically as follows:

$$V_1 - V_2 = [m \log I_1 + V'_1] - [m \log I_2 + V'_2] \quad (2)$$

By substituting $V_R$ for $V_1 - V_2$ and $V''$ for $V'_1 - V'_2$ Equation 2 becomes:

$$V_R = \left[ m \log \frac{I_1}{I_2} \right] + V'' \quad (3)$$

Equation 3 indicates that the reference voltage is the sum of the terms $V''$ and $$\left[ m \log \frac{I_1}{I_2} \right]$$

$V''$ is a constant, therefore any variation in the reference voltage must be attributed to the term $$\left[ m \log \frac{I_1}{I_2} \right]$$

However, if the ratio $I_1/I_2$ is held constant for variations in line voltage the term $$\left[ m \log \frac{I_1}{I_2} \right]$$

becomes a constant. Then all the terms on the right side of the equation are constants and the reference voltage is absolute as shown in Fig. 1.

Referring now to Fig. 1 the ratio $I_1/I_2$ is held constant over the operating region of each diode $D_1$ and $D_2$ by setting the ratio of the D.C. voltage across the resistors $R_1$ and $R_2$ equal to the ratio of the D.C. voltage across the diodes $D_1$ and $D_2$, which can be mathematically expressed by the equation $$\frac{V_{AB}}{V_{CD}} = \frac{V_{B3}}{V_{D3}} \quad (4)$$

which is independent of line fluctuations as indicated by the following:

Where K equals the variation in voltage across the resistors $R_1$ and $R_2$ due to a change in line voltage, and $K'$ equals the variation in voltage across the diodes $D_1$ and $D_2$ due to a variation K across the resistors $R_1$ and $R_2$, the ratio of mean voltage to the variation voltage for each diode circuit can be expressed as:

$$e_1 = \frac{V_{AB} + V_{B3}}{V_{AB} + V_{B3} + K[V_{AB} + K'V_{B3}]} \quad (5)$$

$$e_2 = \frac{V_{CD} + V_{D3}}{V_{CD} + V_{D3} + K[V_{CD} + K'V_{D3}]} \quad (6)$$

By setting $e_1$ equal to $e_2$ the equation becomes $$\frac{V_{AB} + V_{B3}}{V_{AB} + V_{B3} + K[V_{AB} + K'V_{B3}]}$$

$$= \frac{V_{CD} + V_{D3}}{V_{CD} + V_{D3} + K[V_{CD} + K'V_{D3}]} \quad (7)$$

By cross multiplying, Equation 7 becomes $$(V_{AB} + V_{B3})[V_{CD} + V_{D3} + K(V_{CD} + K'V_{D3})]$$
$$= (V_{CD} + V_{D3})[V_{AB} + V_{B3} + K(V_{AB} + K'V_{B3})] \quad (8)$$

Reducing Equation 8 we obtain $$(V_{AB} V_{D3})(KK' - K) = (V_{CD} V_{B3})(KK' - K) \quad (9)$$

Dividing thru by $(KK' - K)$ Equation 9 becomes $$\frac{V_{AB}}{V_{CD}} = \frac{V_{B3}}{V_{D3}} = \frac{R_1 I_1}{R_2 I_2} \quad (10)$$

Thus by setting the ratio of voltage variation in the two diode circuits equal, the ratio $I_1/I_2$ becomes independent of line fluctuations when the silicon reference diodes $D_1$ and $D_2$ are operating in the zener region. The additional transformer taps 2 and 4 provide the desired D.C. voltage ratios $V_{AB}/V_{CD}$ to satisfy the above requirement.

If a lower order of dynamic accuracy is satisfactory for a reference voltage, one D.C. source can be used in the regulating circuit, which requires that the ratio of the voltage across each resistor and the reference diode with which it is in series be a minimum of 5 to 1.

Such an arrangement is shown in Fig. 3 in which the same reference characters used in connection with Fig. 1 are applied to like parts in Fig. 3. As shown in Fig. 3 the intermediate taps 2 and 4, the rectifying diodes 19 and 25 and their connections to the resistors $R_1$ and $R_2$ have been omitted. Also the rectifying diodes 17 and 24 are each connected in series with both the resistor $R_1$ and the reference diode $D_1$, and with resistor $R_2$ and the reference diode $D_2$.

When the end tap 1 is positive and the end tap 5 negative current will flow from the tap 1 through the conductor 16, and the diode 17 and resistor $R_1$ interposed therein, and back to the center tap 3 through the conductor 21 and reference diode $D_1$ interposed therein, and conductor 20. At the same time current will flow from the tap 1 through the rectifying diode 17, conductors 16, 23 and 18, resistor $R_2$ and back to the center tap 3 through the conductor 22, reference diode $D_2$ and conductor 20.

When the end tap 5 is positive and the end tap 1 negative current will bow from the tap 5 through the rectifying diode 24, conductors 23 and 16, resistor $R_1$ and back to the center tap 3 through the conductor 21, reference diode $D_1$ and conductor 20; and at the same time current will flow from the tap 5 through the rectifying diode 24, conductors 23 and 18, resistor $R_2$ and back to the center tap 3 through conductor 22, reference diode $D_2$ and conductor 20. The reference voltage is the difference between the voltage at B of the current flowing through the resistor $R_1$, and the voltage at D of the current flowing through the resistor $R_2$.

From the foregoing it will be apparent to those skilled in this art that I have provided very simple and efficient means for accomplishing the objects of the invention.

It is to be understood that I am no limited to the specific constructions shown and described herein as various modifications may be made therein within the spirit of the invention and the scope of the appended claims.

What is claimed is:

1. A device for providing a D.C. reference voltage comprising a transformer having a primary winding which is adapted to be connected to a source of A.C. voltage and a secondary winding having a center tap and an end tap, a rectifying diode, a resistor, a silicon reference diode having zener characteristics, a second resistor, a second silicon reference diode having zener characteristics, conductor means by which said rectifying diode, said resistor and said reference diode are connected in series between said end tap and said center tap; other conductor means by which said rectifying diode, said second resistor and said second reference diode are connected in series between said end tap and said center tap, an output terminal interposed in said conductor means between said resistor and said reference diode, and a second output terminal interposed in said other conductor means between said second resistor and said second reference diode, the difference in voltage between said output terminal and said second output terminal being the reference voltage.

2. A device for providing a D.C. reference voltage comprising a transformer having a primary winding which is adapted to be connected to a source of A.C. voltage and a secondary winding having a center tap, an end tap at one end thereof and a second end tap at the other end thereof; a rectifying diode, a resistor, a silicon reference diode having zener characteristics, a second rectifying diode, a second resistor, a second silicon reference diode having zener characteristics; conductor means by which said rectifying diode, said resistor, and said reference diode are connected in series between said end tap and said center tap; a second conductor means by which said rectifying diode, said second resistor, and said second reference diode are connected in series between said end tap and said center tap; a third conductor means by which said second rectifying diode, said resistor and said reference diode are connected in series between said second end tap and said center tap; a fourth conductor means by which said second rectifying diode, said second resistor and said second reference diode are connected in series between said second end tap and said center tap, an ouput terminal interposed in said conductor means between said resistor and said reference diode, and a second output terminal interposed in said second conductor means between said second resistor and said second reference diode, the difference in voltage between said output terminal and said second output terminal being the reference voltage.

3. A device for providing a D.C. reference voltage comprising, a transformer having a primary winding which is adapted to be connected to a source of A.C. voltage and a secondary winding having a center tap, an end tap, and an intermediate tap disposed between said center tap and said end tap; a rectifying diode, a resistor, a silicon reference diode having zener characteristics, a second rectifying diode, a second resistor, a second silicon reference diode having zener characteristics; conductor means by which said rectifying diode, said resistor and said reference diode are connected in series between said end tap and said center tap; other conductor means by which said second rectifying diode, said second resistor, and said second reference diode are connected in series between said intermediate tap and said center tap, an output terminal interposed in said conductor means between said resistor and said reference diode, and a second output terminal interposed in said other conductor means between said second resistor and said second reference diode, the difference in voltage between said output terminal and said second output terminal being the reference voltage.

4. A device for providing a D.C. reference voltage comprising a transformer having a primary winding adapted to be connected to a source of A. C. voltage, and a secondary winding having a center tap, an end tap at one end thereof, a second end tap at the other end thereof, an intermediate tap disposed between said center tap and said end tap, and a second intermediate tap disposed between said center tap and said second end tap; a rectifying diode, a resistor, a silicon reference having zener characteristics, a second rectifying diode, a second resistor, a second silicon reference diode having zener characteristics, a third rectifying diode, a fourth rectifying diode; conductor means by which said rectifying diode, said resistor, and said reference diode are connected in series between said end tap and said center tap; a second conductor means by which said second rectifying diode, said second resistor, and said second reference diode are connected in series between said intermediate tap and said center tap; a third conductor means by which said third rectifying diode, said resistor, and said reference diode are connected in series between said second end tap and said center tap; a fourth conductor means by which said fourth rectifying diode, said second resistor, and said second reference diode are connected in series between second intermediate tap and said center tap, an output terminal interposed in said conductor means between said resistor and said reference diode, and a second output terminal interposed in said second conductor means between said second resistor and said second reference diode, the difference in voltage between said output terminal and said second output terminal being the reference voltage.

5. A device for providing a D.C. reference voltage as defined in claim 3, in which the ratio of the D.C. voltage across the two resistors is equal to the ratio of the voltage across the two reference diodes.

6. A device for providing a D.C. reference voltage as defined in claim 4 in which the ratio of the D.C. voltage across the two resistors is equal to the ratio of the voltage across the two reference diodes.

7. A device for providing a D.C. reference voltage as defined in claim 3, in which the two reference diodes have identical slopes, but different voltage intercepts.

8. A device for providing a D.C. reference voltage as defined in claim 7, in which the ratio of the D.C. voltage across the two resistors is equal to the ratio of the voltage across the two reference diodes.

9. A device for providing a D.C. reference voltage as defined in claim 4, in which the two reference diodes have identical slopes, but different voltage intercepts.

10. A device for providing a D. C. reference voltage as defined in claim 9, in which the ratio of the D.C. voltage across the two resistors is equal to the ratio of the voltage across the two reference diodes.

11. A device for providing a D.C. reference voltage comprising, a transformer having a primary winding which is adapted to be connected to a source of A.C. voltage and a secondary winding having a center tap, an end tap, and an intermediate tap disposed between said center tap and said end tap; a rectifying diode, a resistor, a silicon reference diode having zener characteristics, a second rectifying diode, a second resistor, a second silicon reference diode having zener characteristics; conductor means by which said rectifying diode, said resistor and said reference diode are connected in series between said end tap and said center tap; and other conductor means by which said second rectifying diode, said second resistor, and said second reference diode are connected in series between said intermediate tap and said center tap, the reference voltage being the difference between the voltages across each reference diode.

12. A device for providing a D.C. reference voltage comprising a transformer having a primary winding adapted to be connected to a source of A.C. voltage, and a secondary winding having a center tap, an end tap at one end thereof, a second end tap at the other end thereof, an intermediate tap disposed between said center tap and said end tap, and a second intermediate tap disposed between said center tap and said second end tap; a rectifying diode, a resistor, a silicon reference diode having zener characteristics, a second rectifying diode, a second resistor, a second silicon reference diode having zener characteristics, a third rectifying diode, a fourth rectifying diode; conductor means by which said rectifying diode, said resistor, and said reference diode are connected in series between said end tap and said center tap; a second conductor means by which said second rectifying diode, said second resistor, and said second reference diode are connected in series between said intermediate tap and said center tap; a third conductor means by which said third rectifying diode, said resistor, and said reference diode are connected in series between said second end tap and said center tap; and a fourth conductor means by which said fourth rectifying diode, said second resistor, and said second reference diode are connected in series between said second intermediate tap and said center tap, the reference voltage being the difference between the voltages across each reference diode.

13. A device for providing a D.C. reference voltage as defined in claim 11, in which the two reference diodes have identical slopes, but different voltage intercepts.

14. A device for providing a D.C. reference voltage as defined in claim 13, in which the ratio of the D.C. voltage across the two resistors is equal to the ratio of the voltage across the two reference diodes.

15. A device for providing a D.C. reference voltage as defined in claim 12, in which the two reference diodes have identical slopes, but different voltage intercepts.

16. A device for providing a D.C. reference voltage as defined in claim 15, in which the ratio of the D.C.

voltage across the two resistors is equal to the ratio of the voltages across the two reference diodes.

17. A device for providing a D.C. reference voltage comprising a pair of silicon reference diodes having zener characteristics and identical slopes, circuit means by which a D.C. voltage is applied to one of said reference diodes and a higher D.C. voltage applied to the other of said reference diodes, the arrangement of said circuit means being such that the D.C. reference voltage is the difference between the voltage across each of said diodes.

18. A device for providing a D.C. reference voltage comprising an electrical circuit, a resistor and a silicon reference diode having zener characteristics interposed in said circuit in series with each other, a second electrical circuit, a second resistor and a second silicon reference diode having zener characteristics interposed in said second circuit in series with each other, and means connecting said circuits to a source of D. C. voltage, the arrangement of said circuits being such that the D.C. reference voltage is the difference between the voltages across each of said diodes.

19. A device for providing a D.C. reference voltage comprising an electrical circuit, a resistor and a silicon reference diode having zener characteristics interposed in said circuit in series with each other, a second electrical circuit, a second resistor and a second silicon reference diode having zener characteristics interposed in said second circuit in series with each other, means connecting said circuit to a source of D.C. voltage, and means connecting said second circuit to a source of higher D.C. voltage, the arrangement of said circuits being such that the D.C. reference voltage is the difference between the voltages across each of said diodes.

20. A device for providing a D.C. reference voltage comprising a pair of silicon reference diodes having zener characteristics and identical slopes, circuit means by which a D.C. voltage is applied to said reference diodes, the arrangement of said circuit means being such that the D.C. reference voltage is the difference between the voltage across each of said diodes.

References Cited in the file of this patent
UNITED STATES PATENTS

| | | |
|---|---|---|
| 2,581,124 | Moe | Jan. 1, 1952 |
| 2,759,150 | Rosenbaum | Aug. 14, 1956 |